United States Patent
Jarabek et al.

(10) Patent No.: US 7,542,484 B2
(45) Date of Patent: Jun. 2, 2009

(54) MANAGING PAYLOAD SPECIFIC LATENCIES IN A CROSS-CONNECT SYSTEM

(75) Inventors: Andrew Jarabek, Ontario (CA); Aris Tombul, Ontario (CA)

(73) Assignee: Nortel Networks Limited, St. Laurent (CA)

(*) Notice: Subject to any disclaimer, the term of this patent is extended or adjusted under 35 U.S.C. 154(b) by 982 days.

(21) Appl. No.: 10/675,463

(22) Filed: Sep. 30, 2003

(65) Prior Publication Data

US 2005/0068991 A1 Mar. 31, 2005

(51) Int. Cl.
*H04J 3/06* (2006.01)
*H04L 12/56* (2006.01)
(52) U.S. Cl. .................. 370/503; 370/395.1; 370/466
(58) Field of Classification Search .......... None
See application file for complete search history.

(56) References Cited

U.S. PATENT DOCUMENTS

| | | | | |
|---|---|---|---|---|
| 5,287,513 A | * | 2/1994 | Ferguson | 370/360 |
| 5,351,236 A | * | 9/1994 | Pawelski | 370/358 |
| 5,717,693 A | * | 2/1998 | Baydar et al. | 370/514 |
| 6,034,947 A | * | 3/2000 | Yoshida et al. | 370/244 |
| 6,498,794 B1 | * | 12/2002 | Tsukamoto et al. | 370/395.1 |
| 7,133,415 B2 | * | 11/2006 | Zelig et al. | 370/466 |
| 2004/0100994 A1 | * | 5/2004 | Miller | 370/503 |

* cited by examiner

*Primary Examiner*—Ricky Ngo
*Assistant Examiner*—Clemence Han
(74) *Attorney, Agent, or Firm*—Curtis B. Behmann; Border Ladner Gervis LLP

(57) ABSTRACT

A method and apparatus for managing latency includes receiving data from synchronous transport signals (STS) and virtual tributary (VT) sources, providing a provisioning bit for each output associated with a memory, and adjusting a pointer for the VT sources based on the provisioning bit such that the STS and VT outputs are synchronized.

21 Claims, 4 Drawing Sheets

MANAGING PAYLOAD SPECIFIC LATENCIES IN A CROSS-CONNECT SYSTEM

BACKGROUND

This invention relates to managing payload specific latencies in a cross-connect system.

In a synchronous transmission system or network, data traffic takes the form of synchronous data signals comprised of data frames. Data traffic is transported in high order or low order data structures, where a high order structure may include more than one low order structure. For example, a synchronous digital hierarchy (SDH) system carries data in structures known as virtual containers (VCs), which may be high order containers, for example a VC-4, or low order containers, for example a VC-11 or VC-12. For example, a VC-4 may include 63 VC-12s or two low order VC-3s and 21 VC-12s. The VCs are transported across a network in frames known as synchronous transport module (STM) frames. Similarly, a synchronous optical network (SONET) system carries data in high order structures known as synchronous transport signals (STS) or low order structures known as virtual tributaries (VTs). An STS-1 may include some combination of lower signals such as 28 VT1.5s or 21 VT2s, where VT2s are comparable with SDH VC-12s. VC-11s and VC-12s are transported in tributary units TU-11 and TU-12 respectively.

In some cases, is not desirable for network equipment to provide full low order switching. It is, however, desirable for network equipment to provide some low order switching of VT (VT1.5/VT2) and/or TU (TU11/TU12) rate signals. This is commonly known as partial VT/TU switching. A system including both a VT/TU switching apparatus and an STS switching apparatus provides partial VT/TU switching. In such an arrangement, the high-order (STS/VC-3/VC-4) switch passes to the VT/TU switch only VT/TU traffic that requires switching (where switching normally includes timeslot interchanging and/or port interchanging).

SUMMARY

In one aspect, the invention features a method and apparatus for managing latency. The method includes receiving data from high-order synchronous transport module (STM) and synchronous transport signal (STS) sources and low-order tributary unit (TU) and virtual tributary (VT) sources, providing a provisioning bit for each output associated with a memory, and adjusting a pointer for the low-order (VT/TU) sources based on the provisioning bit such that the high-order (STS/STM/AU-5/AU-3) and low-order (VT/TU) outputs are synchronized.

One of more of the following features may also be included. The method may include determining an adjustment for the pointer based on a predetermined delay or adjusting the pointer by a predetermined number of time slots. The method may include assembling synchronized outputs from the memory. The method may include adjusting the high-order pointer to synchronize the output of the low-order and high-order sources, where the high-order sources incur less delay to pass through the memory than low-order sources. Providing a provisioning bit can include storing the provisioning bit in a connection memory. The method includes adjusting a pointer for the low-order sources based on the provisioning bit. The method includes setting the provisioning bit for low order sources and adjusting the pointer when the provisioning bit is set. The method includes setting the provisioning bit for high-order sources and not adjusting the pointer when the provisioning bit is-not set.

One or more aspects of the invention may provide one or more of the following advantages.

The use of a provisioning bit allows a user to set the expected signal type and switch the signal according to the type. For high-order signals such as an STS signal that are to be groomed or switched at the low-order level such as a VT signal, the pointer is adjusted allowing synchronization of the outputs from the cross-connect device.

Typically, signals switched at the high-order by a high-order switch incur less delay than low-order signals that are switched by a low-order switch. A low-order switch is capable of grooming higher-order signals as a concatenation of low-order signals and overhead, however, the high-order signals incur the same delay as the low-order signals.

A technique for switching both types of signals is to subtend a low-order switch from a high-order switch. Using this technique, the high-order switch forwards only the signals that require further grooming to the low-order switch. The signals groomed at the low-order incur more delay than those groomed only at the high-order. Using this technique at least two switch devices or stages are required and two sets of connections need to be provisioned; one for the high-order cross-connect and one for the low-order cross-connect. If a single device includes both functions, latency can be managed by signal type, provisioning complexity can be reduced and memory resources could be better managed.

Since the amount of delay incurred in a signal is proportional to the amount of data memory required to buffer the signals for switching, a switch with a limited amount of memory can dynamically (or statically under user control) partition the memory or memories to accommodate switching some portion of the data as STS-only signals and to accommodate some other portion for VT switching. Typically, the input bandwidth of a switch capable of VT switching is limited to the amount of memory under its control. By efficiently using larger segments of memory for VT switching and smaller segments for STS switching, the maximum input bandwidth becomes a function of the proportion of the bandwidth (and thus memory) that is being used for VT switching.

The ability to swap a first connection RAM and a second connection RAM provides system flexibility by allowing a user to switch the expected signal type (indicated by the provisioning bit) while the cross-connect is in operation.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
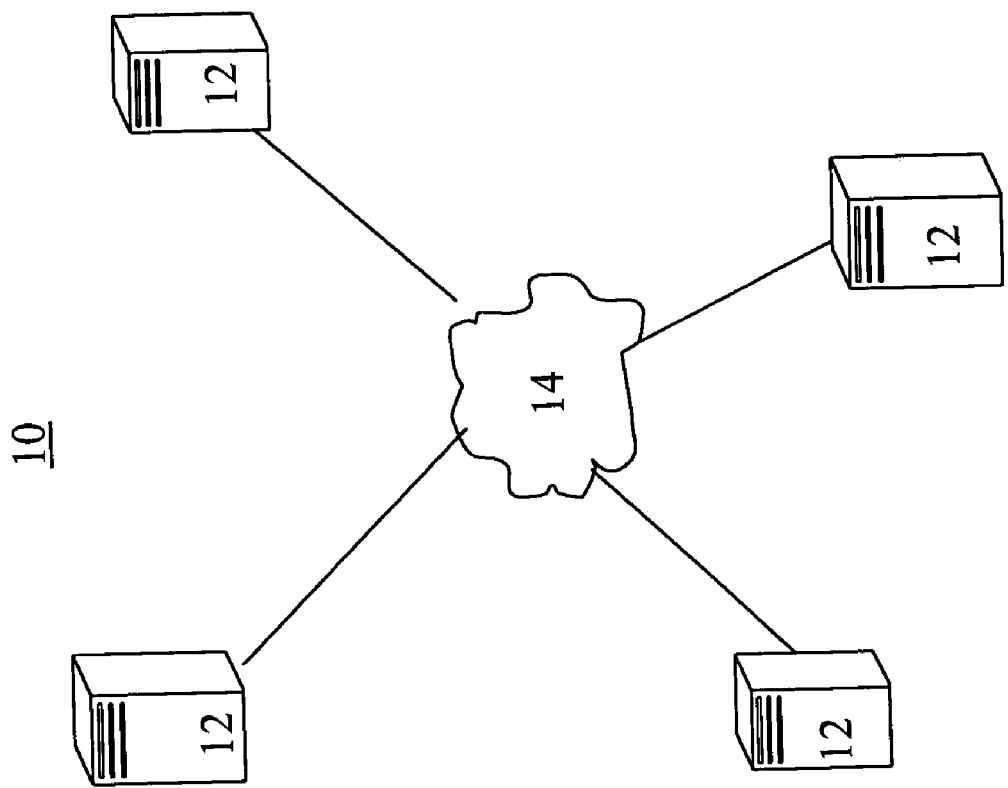
FIG. 1 is a block diagram of a network.

Referring to FIG. 1, a network 10 includes a plurality of network elements 12 in communication using a network infrastructure 14. The network infrastructure 14 may include network elements or nodes, and/or sub-networks. The network elements include synchronous transmission apparatus such as a multiplexer, a regenerator, or a cross-connect (not shown). In one example, the network can be a synchronous optical network (SONET) and/or synchronous digital hierarchy (SDH) network. Network elements 12 in network 10 switch data traffic.

An application specific integrated circuit (ASIC) provides cross-connection and protocol conversion functions. The ASIC includes a random access memory (RAM) that provides a cross-connection between a plurality of input ports and a corresponding plurality of output ports. An associated core logic controls the writing of incoming data to the RAM and subsequent reading of outgoing data from the RAM to provide cross-connection, format conversion, and channel reordering functionality.

In SDH networks, it is desirable for a switching element to control data payloads at the high order level (e.g., at STS, VC-3 or VC-4 level) and at the low order level (e.g., at VT1.5, VT2, TU-11 or TU-12 level). In a SONET network, high order switching is referred to as STS switching, and a high order switch is referred to as an STS switch, while low order switching is referred to as VT switching and a low order switch is referred to as a VT switch. It will be understood however that the invention applies to equivalent SDH, and other, structures and apparatus (e.g. TU switching and TU alignment).

Figure 2:
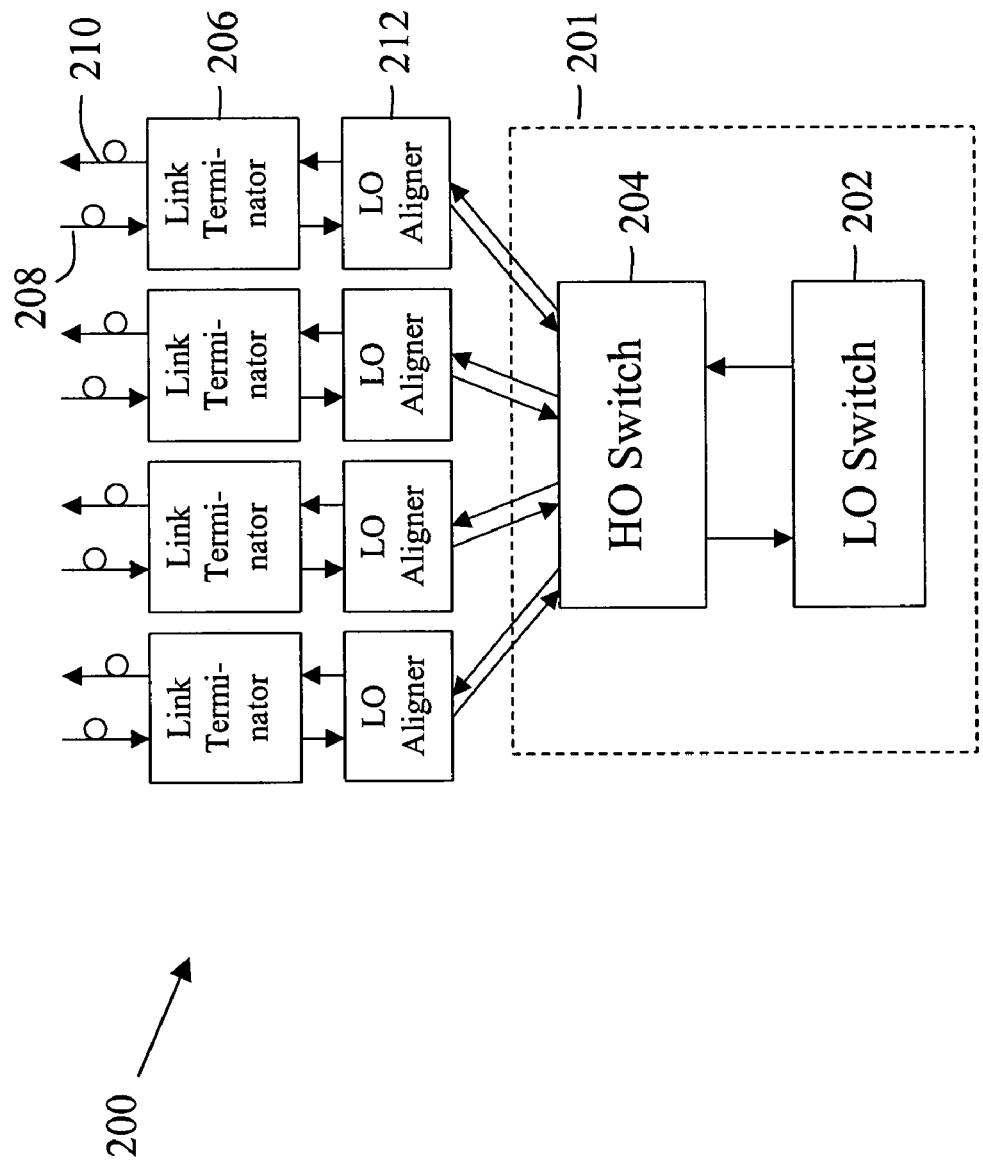
FIG. 2 is a block diagram depicting a cross-connect system.

Referring to FIG. 2, a cross-connect system 200 includes a switch 201. In this example, switch 201 includes two switching stages: a first stage 204 switches high-order signals (e.g. an STS switch) and a second stage 202 switches low-order signals (e.g., a VT switch). The low-order switch 202 is logically subtended from a high-order switch 204 (e.g., the STS switch). When a low-order switch (such as a VT switch) is "subtended" from a high-order switch (such as an STS switch) the high-order switch passes to the low-order switch only portions of an incoming data stream comprising low-order data to be switched (where switching normally takes the form of timeslot interchanging and/or port interchanging) all other data in the incoming data stream is handled by the high-order switch alone.

The cross-connect device 200 also includes a link terminator 206 for respective pairs of input 208 and output 210 communication lines (e.g., optical fibers). The link terminator 206 receives incoming data streams from the input communication line 208, and sends switched outgoing data streams onto the output communication line 210 or to an end user or other network element (not shown). The link terminator 206 is connected to a low-order aligner 212 that aligns an incoming data stream to a local timing reference and aligns an incoming data frame to a reference data frame structure determined by the local timing reference. The low-order aligner also performs low-order pointer processing operations as defined in applicable standards such as the International Telecommunications Union Telecommunications Standardization Sector (ITU-T) standard G707 and Telcordia standard GR253.

Referring to FIG. 2, it is possible to combine the high-order switching function 204 and low-order switching function 202 into a single device. This allows for high-order type signals to be switched with low latency and the low-order type signals to be switched with a higher latency.

Figure 3:
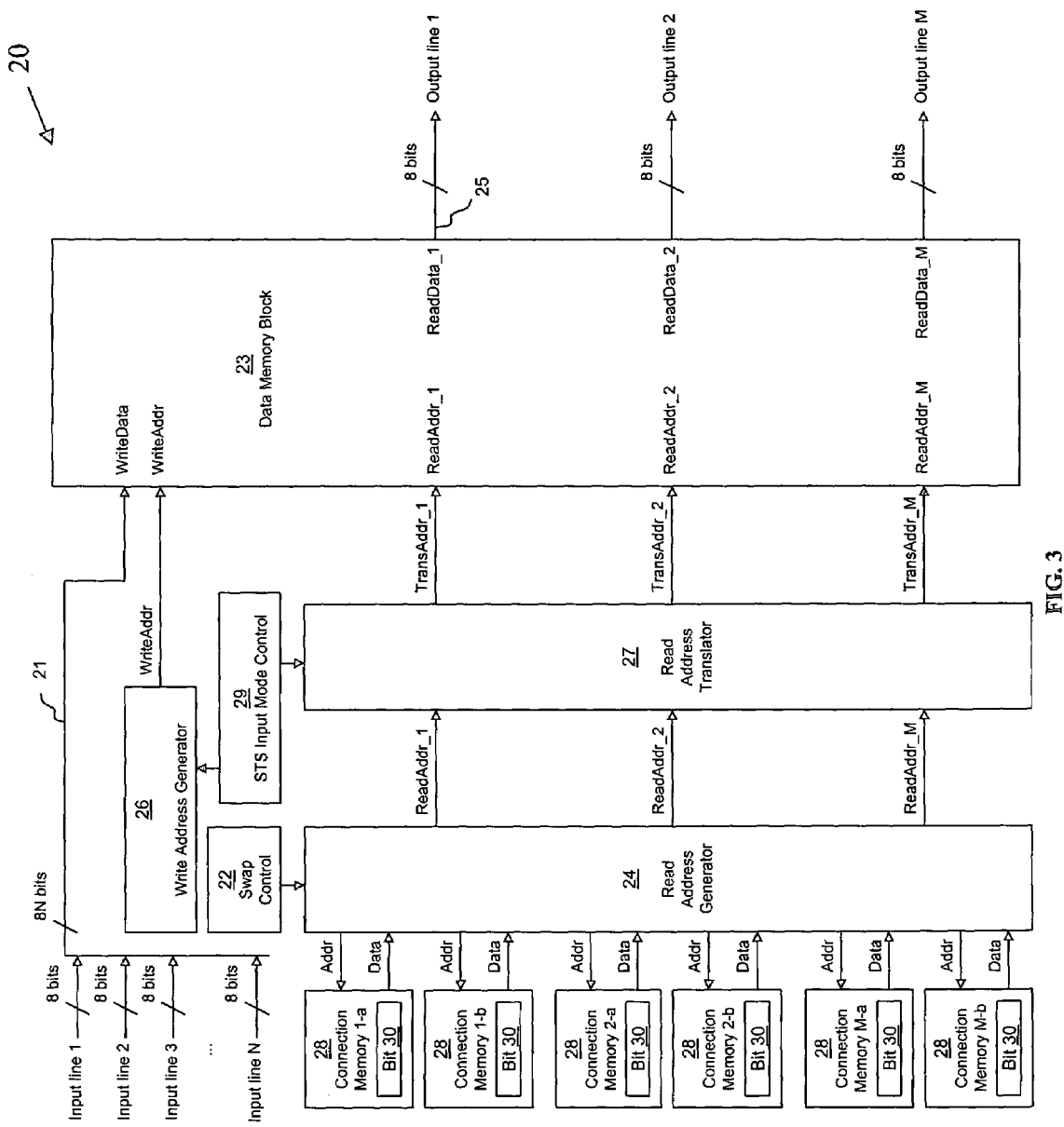
FIG. 3 is a block diagram of a switching core in an STS/VT cross-connect.

Referring to FIG. 3, a slice of the switching core 20 includes an STS input mode control circuit 29 and write address generator 26 that controls a flow for writing the data on input bus 21 into the data memory block 23. Memory block 23 includes one or more RAMs (not shown). The STS input mode control circuit 29 is capable of storing a binary bit of information for every STS input of the switch. Switching core 20 also includes a connection random access memory (RAM) 28 capable of storing a binary bit (provisioning bit 30) of information for every STS output of a VT switch device. Provisioning bit 30 specifies which outputs are sourced as STS connections. The switching core also includes a data memory block 23 that includes one or more RAMs for switching data. Connection RAM 28 controls reading of data out of memory block 23. The slice of the switching core 20 also includes other blocks to manage the switching of data. For example, the switching core 20 includes a swap control module 22, a read address generator 24, and a read address translator 27. The read address translator 27 can be used to map or translate the read addresses emerging from the read address generator 24. Translation may be required if the memory within the data memory block 23 is allocated based on signal type as per the provisioning stored in the STS input mode control block 29.

In VT and STS switches, the switch receives incoming data, writes the data into an internal memory, stores the data for a period of time, and subsequently reads the data from the memory. Factors such as transit delays through the switching apparatus, for example delays associated with pointer processing, contribute to the delay between an input and output of the switch. Consequently, VT and STS switches introduce a delay between a data frame structure received at an input of the switch and a data frame structure delivered on an output of the switch. The VT switch provides data to the STS switch on the same timing as the other inputs to the STS switch, but a data frame from a VT source incurs a greater delay than a data frame from an STS source. Hence, without pointer adjustment or VT alignment, a data frame provided to the STS switch from the output of the VT switch would arrive a number of clock cycles after it was required. Typically, for the STS switch to work correctly, the data frame is supplied before it is needed on the output.

In one example, to ensure STS and VT frames arrive together, the frames supplied to the switch that are to be switched at the VT level have their payload advanced by a predetermined number of clock cycles to compensate for the delays associated with VT switching. The whole input frame is not simply advanced, because certain components of the frame, including the high order pointers and section/line overhead should occupy a fixed position in time with respect to the timing reference of the local node. Such components of the frame are known as fixed overhead. However, the VT traffic (or other low order traffic) is advanced with respect to the frame so that the VT traffic arrives at the switch advanced by an appropriate number of clock cycles to compensate for switch delays. This is achieved by adjusting the high order pointer values (e.g. the AU-4 pointers in SDH or the STS-1 pointers in SONET) to relocate the position of the low order pointers (e.g. the TU pointers or VT pointers).

In a system where both STS and VT sources are received, the VT sources will incur a greater delay when passing through the switching core 20 due to a de-multiplexing stage for VT signals switched at the VT level. The STS-only connections incur a minimum latency when cross-connected through the device. In order for the switch to assemble synchronized outputs that can be a mix of STS-only and VT sources, the pointer for input frames which include VT sources is adjusted as described above. Provisioning bit 30 distinguishes VT sources from STS-only sources. A "set" provisioning bit 30 indicates a VT source and the system will adjust the pointer accordingly. If the provisioning bit is "not set", the source is an STS-only source and the pointer is not adjusted.

In another example, frames that will be switched at the VT level do not have their payload advanced. Instead, they incur delay through the switching core due to VT switching.

Provisioning bit 30 is set to distinguish VT sources from STS-only sources. Before being applied to the switch output, where frames should be synchronized to frames switched as lower latency STS signals, the VT-switched frames have their overhead corrected and pointer offset adjusted such that the fixed overhead aligns between all output frames. As in the previous example, this is achieved by adjusting the high order pointer values (e.g. the AU-4 pointers in SDH or the STS-1 pointers in SONET) to relocate the position of the low order pointers (e.g. the TU pointers or VT pointers).

In both these examples, the provisioning bit 30 is set to indicate a VT source and the provisioning bit is not set to indicate an STS-only source where the state of the bits could be changed. If the state of the bits is changed, the provisioning bit 30 is set to indicate an STS-only source and the provisioning bit is not set to indicate a VT source.

Provisioning bit 30 can be set before the cross-connect is in use, or can be set while the cross-connect is in operation. To set the provisioning bit 30 while in operation, a user sets the control bit 30 in a duplicate connection RAM 28 and swaps control of reading and writing to the duplicate connection RAM 28 using swap control module 22. The ability to swap connection RAM 28 and connection RAM 28 provides system flexibility by allowing a user to switch the expected signal type (indicated by the provisioning bit 30) while the cross-connect is in operation.

Figure 4:
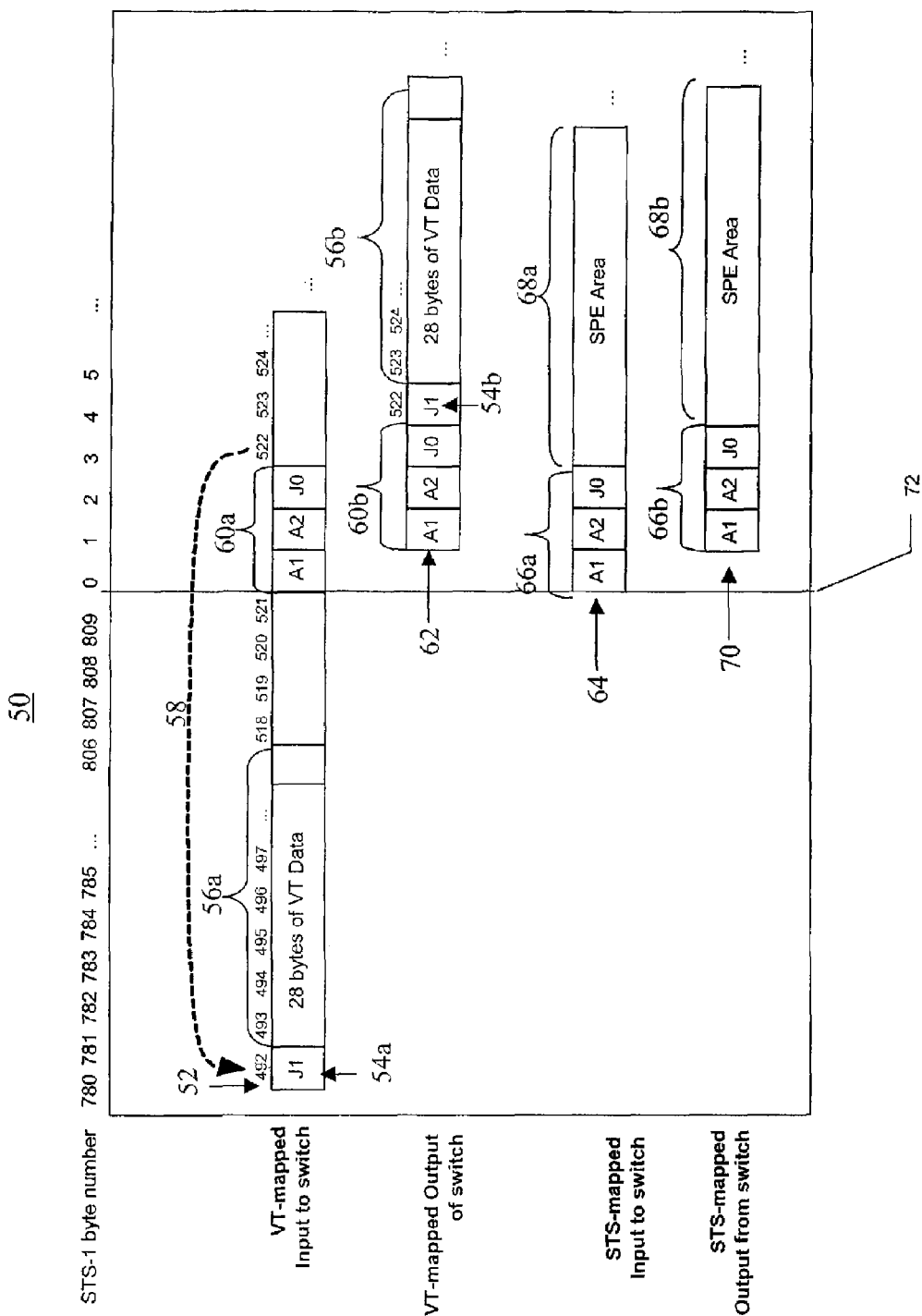
FIG. 4 is a block diagram of mapping for VT and STS signals.

FIG. 4 shows an example mapping 50 including a VT input 52 to the switch, a VT output 62 of the switch, an STS input 64 to the switch, and an STS output 70 from the switch. As described in one example above, in order for the switch to assemble synchronized outputs that include STS-only and VT sources with associated latencies, the input frames including VT sources have their pointer adjusted at the VT switch input. Based on the state of provisioning bit 30, the switch determines if the output is being sourced from an STS input or a VT input. An example of a VT-mapped input to the switch 52 shows the VT-mapped inputs have their SPE (i.e. 28 bytes of VT data 56) fixed to an advanced pointer. For example, the VT frame inputs have their payload which starts with J1 byte rolled back 58 from position 60a (pointer offset '522') to position 54a (pointer offset '492'). After switching, the J1 byte at location 54a is in location 54b in output 62. Likewise, VT data 56b in output 62 is delayed compared to VT data 56a in input stream 52. If the input is an STS entry, the data is read out of the data memory one timeslot after it is written. For example, the overhead 66a (labeled A1, A2, and J0) and the SPE area 68a in STS mapped input 64 are each shifted by a single timeslot (i.e. one STS-1 byte number) to locations 66b and 68b in the STS mapped output 70. The adjustment of the pointer for the VT sources results in no apparent frame skew between the VT mapped output 62 and the STS mapped output 70 (as shown by line 72).

While in this example the pointer was offset by 30 timeslots, the advancement or delay of the payload depends on the relative amount of delay that a data frame encounters in traveling through the data memory block 23. These delays are usually known parameters of the switching apparatus 20.

While FIGS. 1-4 are described primarily in terms of a SONET system, other system types can be used. For example, SDH networks and/or TU switching and alignment can be used.

A number of embodiments of the invention have been described. Nevertheless, it will be understood that various modifications may be made without departing from the spirit and scope of the invention. Accordingly, other embodiments are within the scope of the following claims.

What is claimed is:

1. A method for managing latency comprising:
   receiving data from high-order synchronous transport module (STM) and synchronous transport signal (STS) sources and low-order tributary unit (TU) and virtual tributary (VT) sources;
   providing a provisioning bit for each output; and
   synchronizing high-order and low-order outputs by adjusting a pointer for the low-order sources based on the provisioning bit.

2. The method of claim 1 further comprising determining an adjustment for the pointer based on a predetermined delay.

3. The method of claim 1 wherein said adjusting the pointer includes adjusting the pointer by a predetermined number of time slots.

4. The method of claim 1 further comprising:
   assembling synchronized outputs.

5. The method of claim 1 wherein said adjusting step comprises:
   adjusting the pointer such that the high-order sources incur less delay than low-order sources.

6. The method of claim 1 wherein said providing a provisioning bit includes storing the provisioning bit in a connection memory.

7. The method of claim 1 wherein said adjusting a pointer for the low-order sources based on the provisioning bit includes adjusting the pointer when the provisioning bit is set.

8. The method of claim 7, further comprising:
   setting the provisioning bit for low-order sources.

9. The method of claim 1 wherein said adjusting a pointer for the low-order sources based on the provisioning bit includes not adjusting the pointer when the provisioning bit is not set.

10. The method of claim 9 further comprising:
    setting the provisioning bit for high-order sources.

11. A computer program product tangible embodied on a computer readable medium, for provisioning cross-connects in network switching environment comprising instructions for causing a computer to:
    receive data from high-order synchronous transport module (STM) and synchronous transport signal (STS) sources and low-order tributary unit (TU) and virtual tributary (VT) sources;
    store the data received in a memory for subsequent output;
    provide a provisioning bit for each output; and
    synchronize low-order and high-order outputs by adjusting a pointer for the low-order sources based on the provisioning bit.

12. The computer program product of claim 11 further comprising instructions for causing a computer to:
    determine an adjustment for the pointer based on a predetermined delay.

13. The computer program product of claim 11 further comprising instructions for causing a computer to:
    adjust the pointer by a predetermined number of time slots.

14. The computer program product of claim 11 further comprising instructions for causing a computer to:
    assemble synchronized outputs from the memory.

15. The computer program product of claim 11 further comprising instructions for causing a computer to:
    adjust the pointer to synchronize the output of the low-order and high-order sources, wherein the high-order sources incur less delay to pass through the memory than low-order sources.

16. The computer program product of claim 11 further comprising instructions for causing a computer to:
  store the provisioning bit in a connection memory.

17. The computer program product of claim 11 further comprising instructions for causing a computer to:
  adjust a pointer for the low-order sources based on the provisioning bit includes adjusting the pointer when the provisioning bit is set.

18. The computer program product of claim 11 further comprising instructions for causing a computer to:
  adjust a pointer for the low-order sources based on the provisioning bit includes not adjusting the pointer when the provisioning bit is not set.

19. An apparatus including:
  a first circuit configured to receive data from high-order synchronous transport module (STM) and synchronous transport signal (STS) sources and low-order tributary unit (TU) and virtual tributary (VT) sources;
  a memory for storing the data received for subsequent output;
  a connection memory for storing a provisioning bit for each output;
  a second circuit configured to synchronize the low-order and high order outputs by adjusting a pointer for the low-order sources based on the provisioning bit.

20. The apparatus of claim 19 wherein the second circuit is configured to adjust the pointer by a predetermined number of time slots.

21. The apparatus of claim 19 wherein the second circuit is configured to adjust the pointer to synchronize the output of the high-order and low-order sources, wherein the high-order sources incur less delay to pass through the memory than low-order sources.

* * * * *